No. 728,897. PATENTED MAY 26, 1903.
C. GARVER.
AUTOMATIC WAGON BRAKE.
APPLICATION FILED AUG. 11, 1902.
NO MODEL. 2 SHEETS—SHEET 1.

WITNESSES:
P. A. Kiger
Emma Pope

Charles Garver INVENTOR

BY W. P. Burns
ATTORNEY

No. 728,897. PATENTED MAY 26, 1903.
C. GARVER.
AUTOMATIC WAGON BRAKE.
APPLICATION FILED AUG. 11, 1902.
NO MODEL. 2 SHEETS—SHEET 2.
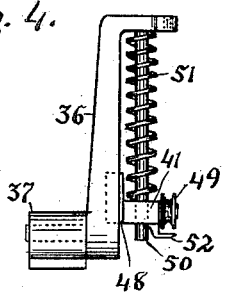
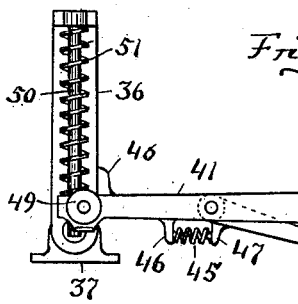
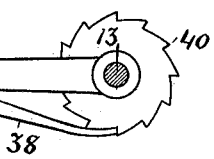
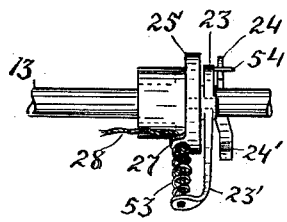
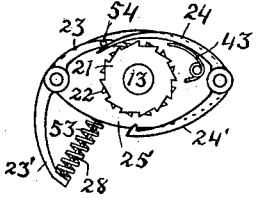
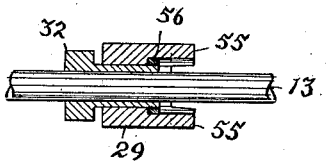
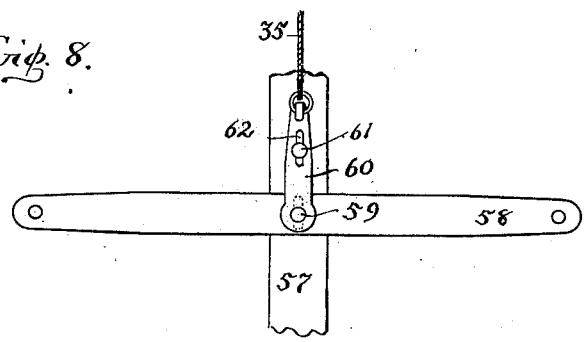
WITNESSES: Charles Garver INVENTOR
BY
ATTORNEY No. 728,897. Patented May 26, 1903.

UNITED STATES PATENT OFFICE.

CHARLES GARVER, OF FORT WAYNE, INDIANA, ASSIGNOR OF ONE-HALF TO SAMUEL F. SWAYNE, OF FORT WAYNE, INDIANA.

AUTOMATIC WAGON-BRAKE.

SPECIFICATION forming part of Letters Patent No. 728,897, dated May 26, 1903.

Application filed August 11, 1902. Serial No. 119,195. (No model.)

*To all whom it may concern:*

Be it known that I, CHARLES GARVER, a citizen of the United States, residing at Fort Wayne, in the county of Allen and State of Indiana, have invented certain new and useful Improvements in Automatic Wagon-Brakes; and I do declare the following to be a full, clear, and exact description of the invention, such as will enable others skilled in the art to which it appertains to make and use the same, reference being had to the accompanying drawings, and to the figures marked thereon, which form a part of this specification.

My invention relates to improvements in automatic wagon-brakes; and the object of my improvement is to afford automatic means of applying the wagon-brake with such varying degrees of force as to be effectual under varied conditions of grade and load.

I accomplish my object by the construction illustrated in the accompanying drawings, in which—

Figure 1:
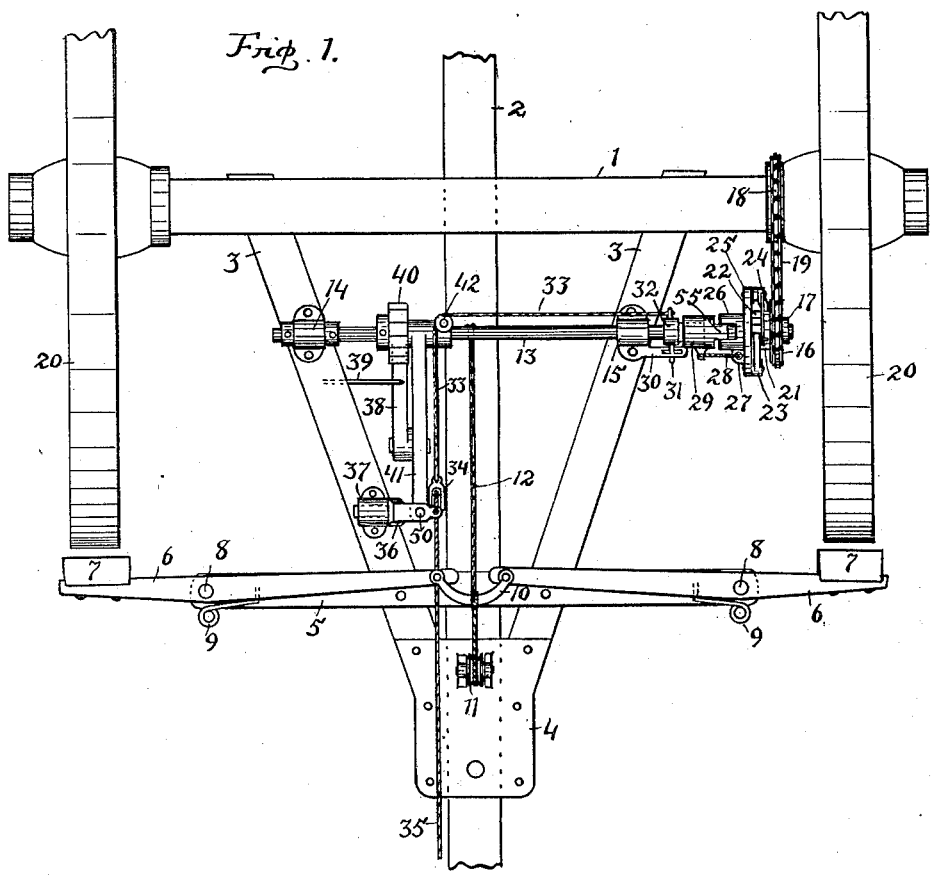
Figure 2:
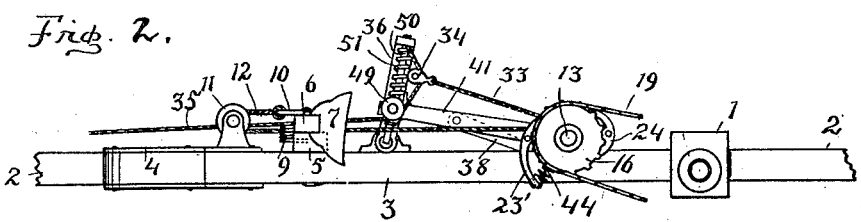

Figure 1 is a plan showing the brake in position upon the gears of a wagon. Fig. 2 is a side elevation of the brake in position with the wagon-wheels omitted. Fig. 3 is a detail showing a side elevation of the tension-lever. Fig. 4 is an end view of Fig. 3. Fig. 5 is a detail showing an end view of the clutch mechanism. Fig. 6 is a side view of Fig. 5. Fig. 7 is a detail in section, showing the sliding collar; and Fig. 8 is a plan showing the arrangement of the doubletree of the wagon.

Similar numerals of reference indicate corresponding parts throughout the several views.

In the construction of my wagon-brake a revoluble horizontal shaft 13 is mounted in bearings 14 and 15, which are fixed, respectively, upon the hounds 3 3 of the wagon-gear. The position of the shaft 13 is parallel with the axle 1 and has mounted loosely upon one of its ends a sprocket-wheel 16. One of the rear wheels 20 of the wagon has fixed upon its hub a driving-sprocket 18, and a sprocket-driving chain 19 is trained thereon to drive the sprocket-wheel 16. Two ratchet-wheels 21 and 22 are loosely mounted upon the shaft 13 and are rigidly fixed to the sprocket-wheel 16, to be carried thereby. The said ratchet-wheels are respectively arranged with their notches oppositely. A plate 25, having a slotted boss 26, is mounted rigidly upon the shaft 13 at a point adjoining the ratchet-wheels and carries the pawls 23 and 24, which are arranged oppositely. The pawl 23 is adapted to engage with the ratchet-wheel 22, and the pawl 24 has a hooked end 24', which is suited to engage with the ratchet-wheel 21. A pin 54 projects from the side of the pawl 23 and overhangs the free end of the pawl 24, whereby the pawl 24 is hindered from engaging with its respective ratchet-wheel during periods when the pawl 23 rests in engagement with the ratchet-wheel 22. A sleeve 32 is loosely mounted upon the shaft 13 and is arranged to be moved lengthwise thereon. A pin 31 extends from said sleeve and engages in a slotted guide 30, which extends from the bearing 15 to prevent the said sleeve from turning. Upon the shank of the sleeve is loosely mounted a collar 29, the extending lugs 55 of which engage constantly with the slotted boss 26, and the collar is driven thereby. The lugs 55 and the corresponding slots in said boss are of such length as to admit of longitudinal play between the respective pieces. A cord 28 is attached to the side of the collar 29 and leads through an eye 27 on the plate 25 and extends through a coil-spring 53 to the end 23' of the pawl 23, where it is fixed. The said spring is interposed between the pawl 23 and plate 25 to hold said pawl in engagement with the ratchet-wheel 22.

A tension-lever 41 is mounted loosely upon the shaft 13 at a point between the bearings 14 and 15 and ranges forward. A ratchet-wheel 40 is fixed rigidly upon said shaft at a point contiguous to the lever 41. A ratchet 38 is pivoted loosely to said lever and is held into engagement with said ratchet-wheel by the spring 45, which is interposed between the lug 46, which projects from the lever 41, and the lug 47 on the ratchet 38. Upon the side of the lever 41 near its forward end is mounted an idle pulley 49. A vertical swinging arm 36 is mounted at its lower end in a suitable bearing 37, fixed upon one of the hounds 3. The upper end of the arm 36 is bent at right angles and ranges over the end of the lever 41. A vertical rod 50 is secured in the upper end of the arm and depends therefrom through the end of said lever, and a spring 51 is arranged upon said rod and is interposed between the upper end of said arm and said lever. A shoulder 48 extends from the side of the lever 41 against which the arm 36 rests. A cable 35 is trained upon the pulley 49 and is fixed to the extending upper end of the arm 36. A traveling pulley 34 is connected with the cable 35 at a point between the pulley 49 and the top of the arm, and another cable 33 is connected with said traveling pulley and leads therefrom over the idle pulley 42 and from thence to the sleeve 32, to which it is fixed. The forward end of the cable 35 is connected with a longitudinally-movable plate 60, which is coupled to the doubletree 58. The pin 59 passes through said doubletree and tongue 57, the opening in the tongue for said pin being elongated sufficiently to admit of play for actuating the plate 60. The pin 61 passes into the tongue through the elongated slot 62 in said plate.

A beam 5 is fixed transversely upon the hounds 3 3, and upon its ends are pivoted, as shown at 8, the brake-beams 6 6, which have brake-shoes 7 arranged at their outer ends. Springs 9 are fixed to said brake-beams and beam 5 to hold the brake-beams in normal position. The inner ends of the brake-beams are loosely coupled by a link 10, and a cable 12 is attached to the link and leads forward therefrom over a pulley 11, arranged upon the plate 4, and from thence rearward to the shaft 13, to which it is secured. By this construction my brake will become active when the wagon is moving forward and the cables 35 and 33 are slack. The brake will be inactive when the wagon is moving forward and the said cables are drawn tight, and when moving backward the brake will become active when said cables are drawn tight and inactive when they are slack. As the wagon-wheels roll forward the chain 19 drives the sprocket-wheel 16 and ratchet-wheels 21 and 22 accordingly. As the team continues to draw upon the doubletree the cable 35 is thereby drawn tight, and consequently the cable 33 connected therewith is drawn forward accordingly, thus also drawing the sleeve 32 and collar 29 inwardly, and the cord 28, connecting the collar and pawl 23, draws said pawl from engagement with its ratchet-wheel 22. In this instance the ratchet-wheels 21 and 22 will then revolve idly. When the wagon moves forward faster than the team, as in the case of descending a grade, the cable 35 is thereby allowed to slack, and by means of the spring 53 the pawl 23 is forced into engagement with the ratchet-wheel 22, which thereby causes the shaft 13 to be driven. As the said shaft revolves the cable 12 is wound thereon, which obviously draws said cable rearwardly and actuates the brake-beams. The action of the brake retards the motion of the wagon, and as the team advances the cable 35 is again drawn forward, and by means of the cable 33 and its relation with the pawl 23 the pawl becomes disengaged from its ratchet 22. The shaft 13 is held from retracting relative to the lever 41 by means of the ratchet 38 and ratchet-wheel 40 until the cable 35 is drawn sufficiently tight as to draw the end of the lever 41 and spring 51 upward to a point where the pin 39, fixed upon one of the hounds, will interfere with the ratchet 38 and cause said ratchet to disengage the ratchet-wheel 40, when the shaft 13 will retract to its normal position by means of the tension of the cable 12, which tension is due to the action of the springs 9 upon the brake-beams 6. Thus the wagon is retarded in descending grades just sufficiently to insure a slight tension of the cable 35, caused by the draft of the team, and when the wagon lags sufficiently the brake becomes released. In ascending a grade the draft of the team holds the cables 35 and 33 under tension, thus holding the pawl 23 from engagement with the ratchet-wheel 22, and, the pin 54 on the pawl 23 is thereby lifted, which allows the pawl 24 to act freely, and, aided by the spring 43, the pawl 24 engages the ratchet-wheel 21. Under these conditions should it be desired to set the brake, as for resting the team, the wagon is allowed to move backward, in which instance the shaft 13 is revolved by reason of its relation with the pawl 24 and its revolving ratchet-wheel, and the brake becomes set.

Having described my invention, what I claim as new, and desire to secure by Letters Patent, is—

1. In an automatic wagon-brake, brake-beams having shoes thereon arranged in position to engage the wagon-wheels; a revoluble shaft fixed upon the wagon-gear and having a cable adapted to wind thereon, which cable is connected with the brake-beams to actuate the same; a tension-lever mounted upon the shaft and having also a ratchet and ratchet-wheel connection therewith; means to disengage said ratchet when the lever is raised; a plate fixed upon the shaft, having pawls arranged oppositely thereon; ratchet-wheels loosely mounted upon the shaft with their notches opposite, and being adapted to engage and drive said pawls respectively; a swinging arm mounted upon the wagon-gear, having a spring connection with the tension-lever; a cable in connection with the tension-lever and swinging arm for actuating the same; means in connection with said cable for actuating the pawls; and means in connection with one of the wagon-wheels for driving the ratchet-wheels.

2. In an automatic wagon-brake, brake-beams having shoes thereon arranged in position to engage the wagon-wheels; a revoluble shaft having a rigid plate carrying opposite pawls; ratchet-wheels loosely mounted upon the shaft having their respective notches arranged oppositely and being adapted to engage with said pawls; a tension-lever mounted upon the shaft; means in connection with the wagon-wheel to drive said ratchet-wheels; a cable connecting the shaft and brake-beams to actuate the latter; and means for severally disengaging said pawls from said ratchet-wheels and the tension-lever from said shaft.

3. In an automatic wagon-brake, brake-beams having shoes thereon arranged in position to engage the wagon-wheels; a revoluble shaft fixed upon the wagon-gear and having a cable adapted to wind thereon, which cable is connected with the brake-beams to actuate the same; ratchet mechanism carried by the shaft and having a connection with one of the wagon-wheels whereby the shaft is driven; a tension-lever mounted upon the shaft and having also a ratchet and ratchet-wheel connection therewith; and means to disengage said ratchet from said ratchet-wheel.

In testimony whereof I affix my signature in presence of two witnesses.

CHARLES GARVER.

Witnesses:
WILLIAM M. SWAYNE,
CHAS. D. C. HEUSTIS.